United States Patent
Patel

(10) Patent No.: US 11,515,951 B2
(45) Date of Patent: Nov. 29, 2022

(54) BASE STATION AND ANTENNA INSTALLATION INCLUDING INTERNET PROTOCOL ADDRESSABLE ANTENNA LINE DEVICES AND METHODS OF OPERATING THE SAME

(71) Applicant: CommScope Technologies LLC, Hickory, NC (US)

(72) Inventor: Sammit Patel, Dallas, TX (US)

(73) Assignee: CommScope Technologies LLC, Hickory, NC (US)

( * ) Notice: Subject to any disclaimer, the term of this patent is extended or adjusted under 35 U.S.C. 154(b) by 33 days.

(21) Appl. No.: 17/381,703

(22) Filed: Jul. 21, 2021

(65) Prior Publication Data

US 2021/0351852 A1 Nov. 11, 2021

Related U.S. Application Data

(62) Division of application No. 16/327,814, filed as application No. PCT/US2017/062492 on Nov. 20, 2017, now Pat. No. 11,101,898.

(60) Provisional application No. 62/428,920, filed on Dec. 1, 2016.

(51) Int. Cl.
| | |
|---|---|
| *H04B 17/13* | (2015.01) |
| *H04B 17/12* | (2015.01) |
| *H04B 17/21* | (2015.01) |
| *H04W 4/38* | (2018.01) |
| *H01Q 3/02* | (2006.01) |

(52) U.S. Cl.
CPC .............. *H04B 17/13* (2015.01); *H01Q 3/02* (2013.01); *H04B 17/12* (2015.01); *H04B 17/21* (2015.01); *H04W 4/38* (2018.02)

(58) Field of Classification Search
None
See application file for complete search history.

(56) References Cited

U.S. PATENT DOCUMENTS

| | | | |
|---|---|---|---|
| 7,529,215 B2 | 5/2009 | Oesterling | |
| 2004/0152492 A1 | 8/2004 | Gray | |
| 2005/0136931 A1* | 6/2005 | Bigler | H04W 16/18 455/454 |
| 2006/0217122 A1* | 9/2006 | Levit | H04W 16/18 455/446 |
| 2006/0229048 A1* | 10/2006 | Carroll | H01Q 1/246 455/121 |

(Continued)

FOREIGN PATENT DOCUMENTS

| | | |
|---|---|---|
| CN | 102017305 A | 4/2011 |
| WO | 2015163580 A1 | 10/2015 |
| WO | 2016085125 A1 | 6/2016 |

OTHER PUBLICATIONS

Chinese Office Action corresponding to CN 201780027746.3; dated Sep. 2, 2020 (23 pages, including English translation).

(Continued)

*Primary Examiner* — Brian S Roberts
(74) *Attorney, Agent, or Firm* — Myers Bigel, P.A.

(57) ABSTRACT

A system includes a base station, an antenna coupled to the base station, and an antenna line device coupled to the antenna. The antenna line device is Internet Protocol (IP) addressable and is configured to receive a control signal from a controller.

14 Claims, 7 Drawing Sheets

(56) References Cited

U.S. PATENT DOCUMENTS

| | | | |
|---|---|---|---|
| 2009/0061941 A1* | 3/2009 | Clark | H01Q 1/246 |
| | | | 455/562.1 |
| 2009/0141623 A1 | 6/2009 | Jung et al. | |
| 2010/0296816 A1 | 11/2010 | Larsen | |
| 2011/0105099 A1 | 5/2011 | Roll | |
| 2012/0038513 A1* | 2/2012 | Li | H01Q 3/005 |
| | | | 342/372 |
| 2015/0139071 A1 | 5/2015 | Wu et al. | |
| 2016/0165469 A1* | 6/2016 | Gopalakrishnan | H04W 16/28 |
| | | | 455/67.11 |
| 2016/0378153 A1 | 12/2016 | Kelly et al. | |
| 2017/0170559 A1 | 6/2017 | Van De Water | |
| 2017/0270536 A1* | 9/2017 | Williams | H04W 24/04 |

OTHER PUBLICATIONS

PCT International Preliminary Report on Patentability corresponding to PCT/US2017/062492; dated Jun. 4, 2019 (7 pages).
PCT International Search Report corresponding to PCT/US2017/062492; dated Mar. 5, 2018 (3 pages).
PCT Written Opinion of the International Searching Authority corresponding to PCT/US2017/062492; dated Mar. 5, 2018 (3 pages).
Chinese Office Action corresponding to CN 201780027746.3; dated Jul. 23, 2021 (18 pages, including English translation).

* cited by examiner

BASE STATION AND ANTENNA INSTALLATION INCLUDING INTERNET PROTOCOL ADDRESSABLE ANTENNA LINE DEVICES AND METHODS OF OPERATING THE SAME

CROSS-REFERENCE TO RELATED APPLICATIONS

This application is a divisional of U.S. patent application Ser. No. 16/327,814, filed Feb. 23, 2019, which is a 35 U.S.C. § 371 national stage application of PCT Application No. PCT/US2017/062492, filed Nov. 20, 2017, which claims priority to and the benefit of U.S. Provisional Patent Application No. 62/428,920, filed Dec. 1, 2016, the disclosures of each are hereby incorporated herein in their entireties. The above-referenced PCT Application was published in the English language as International Publication No. WO 2018/102168 A1 on Jun. 7, 2018.

BACKGROUND

The present application claims priority to U.S. Provisional Patent Application Ser. No. 62/428,920, filed Dec. 1, 2016, the entire content of which is incorporated by reference herein as if set forth in its entirety.

The present disclosure relates generally to cellular base station and antenna installations and, more particularly, to antenna line devices used in cellular base station and antenna installations.

Cellular base station and antenna installations typically include a base transceiver station (base station), including radio frequency equipment and baseband equipment, that is supported by a ground structure. The base station unit is generally located in relatively close proximity to a support structure, such as a tower, on which one or more cellular antennas are mounted towards the top of the support structure. One or more microwave antennas may be mounted on the support structure to provide, for example, a backhaul communication link between the base station and the core network. In addition to the cellular and/or microwave antennas, other types of devices known as antenna line devices (ALDs) may also be mounted on the support structure and/or the cellular antennas. These ALDs may include, but are not limited to, tower mounted amplifiers (TMAs), remote electrical tilt systems (RETs), antenna sensor devices (ASDs), and frequency scanning modules. The radio frequency equipment in the base station may include a controller for communicating with the ALDs to control their operation and, in the case of ASDs, collect sensor information therefrom. As shown in FIG. 1, the base station typically communicates with an ALD using an Antenna Interface Standards Group (AISG) communication protocol over either a dedicated eight-pin cable or over the radio frequency path. AISG is based on the RS485 serial communication bus. Referring now to FIG. 2, a block diagram showing a conventional ALD that communicates via AISG is illustrated. The ALD 200 includes an AISG interface that feeds into a surge protection module 205. The surge protection module 205 is coupled to an RS485 drivers module 210 to process the AISG communication protocol. The processor 215 receives the information or command sent from the base station over the AISG interface and drives the ALD function module 220 to carry out the command from the base station. In the case of certain types of ALDs, such as an ASD, sensor information may be read and provided to the processor 215 for communication back to the base station. The ALD 200 may also receive DC power from the AISG eight-pin cable or over the RF feeder path. If DC power is received over the RF feeder path, then a modulator/demodulator and low pass filter circuit 225 may be used. The modulator/demodulator is used to modulate/demodulate the AISG signal onto the RF signal and a bias tee may be used to separate the RF signal from the DC power signal so as to effectively provide a low pass filter for the DC power signal.

ALD communication via the AISG interface uses hard wired cables between ALD devices and the base station and, when DC power is received over the RF feeder path, modulation/demodulation circuitry and bias tees. Such connections use extra cables, connectors, and/or circuits, which may pose reliability risks and/or affect passive intermodulation (PIM) performance. Installing and testing of the AISG connections between the base station and ALDs typically involves the use of handheld controllers, which may be inconvenient and time consuming. Moreover, the AISG standard has evolved relatively slowly and does not support data rates exceeding 9600 baud.

SUMMARY

In some embodiments of the inventive concept, a system comprises a base station, an antenna coupled to the base station, and an antenna line device coupled to the antenna. The antenna line device is Internet Protocol (IP) addressable and is configured to receive a control signal from a controller.

In some embodiments, the antenna line device is an amplifier that is coupled to an output of the antenna, and the amplifier is configured to adjust an amplification of a signal received from the output of the antenna responsive to the control signal.

In some embodiments, the antenna line device is a remote electrical tilt system that is coupled to the antenna, and the remote electrical tilt system is configured to adjust at least one of an elevation angle of the antenna and an azimuth angle of the antenna responsive to the control signal.

In some embodiments, the antenna line device is a sensor that is associated with the antenna, and the sensor is configured to collect information that is associated with the antenna, the information comprising at least one of azimuth angle, elevation angle, latitude coordinate, longitude coordinate, Global Positioning System (GPS) coordinates, wind speed, temperature, vibration amplitude, and vibration frequency.

In some embodiments, the antenna line device is a frequency scanning module that is coupled to the antenna and the frequency scanning module is configured to determine the frequency spectrum in use at the antenna.

In some embodiments, a wireless modem is coupled to the antenna line device. The wireless modem is configured to implement a wireless communication protocol. The wireless communication protocol may comprise one of Z-Wave, 6LowPAN, Thread, WiFi, GSM cellular, 3G cellular, 4G/LTE cellular, 5G/LTE cellular, Sigfox, Neul, and LoRaWAN.

In some embodiments, the antenna line device further comprises a memory and is configured to store a plurality of antenna transmission patterns for the antenna in the memory, the plurality of antenna transmission patterns corresponding to a plurality of elevation angles for the antenna, respectively.

In some embodiments, the antenna line device further comprises a memory and is configured to store a gain of the antenna, a return loss of the antenna, and an isolation of the antenna in the memory.

In some embodiments, the antenna line device further comprises a power circuit that is configured to receive DC power via a radio frequency (RF) connection to the base station. The power circuit comprises a low pass filter without a modulation/demodulation circuit.

In some embodiments, the antenna is coupled to the base station at a bottom end of the antenna and the antenna line device is coupled to the antenna at a top end of the antenna.

In some embodiments, the control signal is generated by a controller that is disposed apart from the base station.

In some embodiments, the antenna line device is further configured to receive the control signal from the controller over the Internet.

In some embodiments, the antenna is one of a plurality of antennas and the antenna line device is one of a plurality of antenna line devices, the plurality of antenna line devices being coupled to the plurality of antennas, respectively, and the plurality of antennas being coupled to the base station. The plurality of antenna line devices are IP addressable and are configured to receive a plurality of control signals, respectively, from the controller. A first one of the antenna line devices is configured to communicate with a second one of the plurality of line devices via an IP communication connection.

In some embodiments of the inventive concept, a method comprises establishing, at an antenna line device, an Internet Protocol (IP) connection with a controller, receiving, at the antenna line device, a control signal from the controller, the control signal being associated with an antenna coupled to the antenna line device.

In some embodiments, the antenna line device is an amplifier that is coupled to an output of the antenna, and the method further comprises adjusting an amplification of a signal received from the output of the antenna responsive to the control signal.

In some embodiments, the antenna line device is a remote electrical tilt system that is coupled to the antenna, and the method further comprises adjusting at least one of an elevation angle of the antenna and an azimuth angle of the antenna responsive to the control signal.

In some embodiments, the antenna line device is a sensor that is associated with the antenna, and the method further comprises collecting information that is associated with the antenna, the information comprising at least one of azimuth angle, elevation angle, latitude coordinate, longitude coordinate, Global Positioning System (GPS) coordinates, wind speed, temperature, vibration amplitude, and vibration frequency.

In some embodiments, the antenna line device is a frequency scanning module that is coupled to the antenna, and the method further comprises determining the frequency spectrum in use at the antenna.

In some embodiments, the antenna line device is coupled to a wireless modem, and establishing, at the antenna line device, the IP connection with the controller comprises using the wireless modem to establish the IP connection with the controller using a wireless communication protocol, the wireless communication protocol comprising one of Z-Wave, 6LowPAN, Thread, WiFi, GSM cellular, 3G cellular, 4G/LTE cellular, 5G/LTE cellular, Sigfox, Neul, and LoRaWAN.

In some embodiments, the antenna line device further comprises a memory, and the method further comprises storing a plurality of antenna transmission patterns for the antenna, the plurality of antenna transmission patterns corresponding to a plurality of elevation angles for the antenna, respectively in the memory.

In some embodiments, the antenna line device further comprises a memory, and the method further comprises storing a gain of the antenna, a return loss of the antenna, and an isolation of the antenna in the memory.

In some embodiments, the antenna is coupled to a base station and the controller is disposed apart from the base station.

In some embodiments, receiving, at the antenna line device, the control signal from the controller comprises receiving, at the antenna line device, the control signal from the controller over the Internet.

In some embodiments, a method comprises establishing Internet Protocol (IP) connections with a plurality of antenna line devices, the plurality of antenna line devices being coupled to a plurality of antennas, respectively, receiving an plurality of antenna transmission patterns from the plurality of antenna line devices, respectively, each respective antenna transmission pattern being based on an elevation angle of the antenna and an azimuth angle of the antenna, receiving a plurality of geographic location coordinates for the plurality of antennas, respectively, and generating a signal coverage map based on the plurality of antenna transmission patterns and the plurality of geographic location coordinates that indicates geographic areas covered by the plurality of antenna transmission patterns.

In some embodiments, a first one of the plurality of antennas is associated with a first cellular service provider and a second one of the plurality of antennas is associated with a second cellular service provider that is different from the first cellular service provider.

In some embodiments, each of the plurality geographic location coordinates comprises a latitude coordinate and a longitude coordinate.

In some embodiments, each of the plurality of geographic location coordinates comprises Global Positioning System (GPS) coordinates.

In some embodiments, a method comprises establishing Internet Protocol (IP) connections with an antenna line device, the antenna line device being coupled to an antenna at a base station installation, receiving frequency spectrum usage information for the antenna from the antenna line device, receiving antenna identification information from the antenna line device, receiving antenna line device identification information from the antenna line device, and generating an installation site summary that comprises the spectrum usage information, the antenna line device identification information, and the antenna identification information.

In some embodiments, the installation site summary comprises a graphic illustration of the antenna and antenna line device.

In some embodiments, the base station installation comprises a plurality of antennas and a plurality of antenna line devices coupled to the plurality of antennas, respectively. Receiving the frequency spectrum usage information comprises receiving frequency spectrum usage information for the plurality of antennas from the plurality of antenna line devices, respectively. Receiving the antenna identification information comprises receiving antenna identification information for the plurality of antennas from the plurality of antenna line devices, respectively. Receiving the antenna line device identification information comprises receiving antenna line device identification information for the plurality of antenna line devices from the plurality of antenna line devices, respectively. And generating the installation site summary comprises generating the installation site summary that comprises the spectrum usage information for the plurality of antennas, the antenna identification information for the plurality of antennas, and the antenna line device identification information for the plurality of antenna line devices.

In some embodiments, the installation site summary comprises a graphic illustration of the plurality of antennas and the plurality of antenna line devices.

In further embodiments, the plurality of antenna line devices comprise an amplifier, a remote electrical tilt system, a sensor, and a frequency scanning module.

It is noted that aspects described with respect to one embodiment may be incorporated in different embodiments although not specifically described relative thereto. That is, all embodiments and/or features of any embodiments can be combined in any way and/or combination. Moreover, other apparatus, methods, systems, and/or articles of manufacture according to embodiments of the inventive subject matter will be or become apparent to one with skill in the art upon review of the following drawings and detailed description. It is intended that all such additional apparatus, systems, methods, and/or articles of manufacture be included within this description, be within the scope of the present inventive subject matter, and be protected by the accompanying claims. It is further intended that all embodiments disclosed herein can be implemented separately or combined in any way and/or combination.

BRIEF DESCRIPTION OF THE DRAWINGS

Other features of embodiments will be more readily understood from the following detailed description of specific embodiments thereof when read in conjunction with the accompanying drawings, in which.

DETAILED DESCRIPTION

Figure 1:
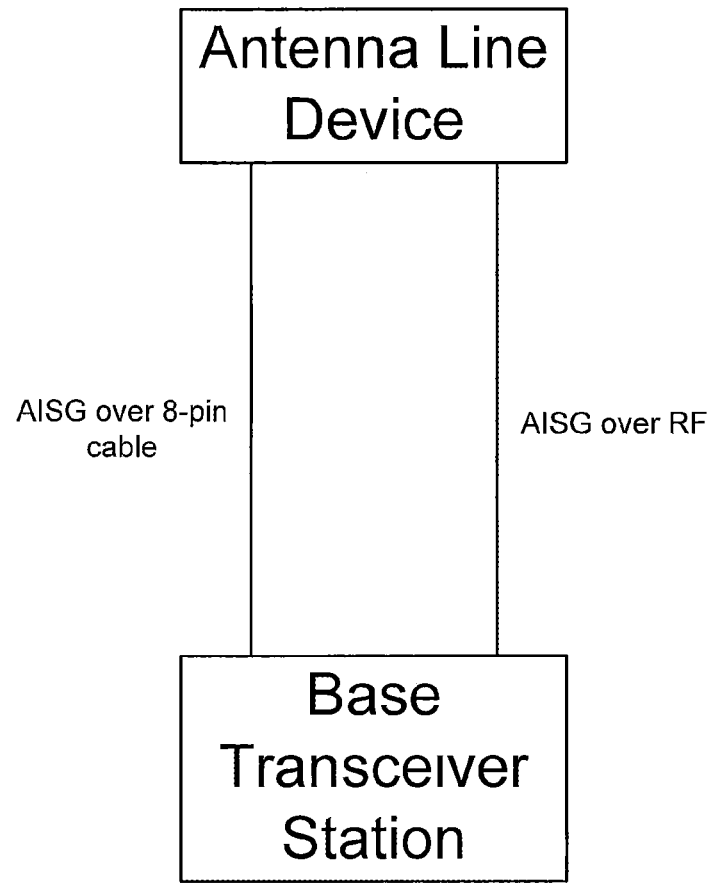
FIG. 1 is a block diagram that illustrates an Antenna Interface Standards Group (AISG) connection between a base station and an antenna line device (ALD)

In the following detailed description, numerous specific details are set forth to provide a thorough understanding of embodiments of the present disclosure. However, it will be understood by those skilled in the art that the present invention may be practiced without these specific details. In some instances, well-known methods, procedures, components and circuits have not been described in detail so as not to obscure the present disclosure. It is intended that all embodiments disclosed herein can be implemented separately or combined in any way and/or combination. Aspects described with respect to one embodiment may be incorporated in different embodiments although not specifically described relative thereto. That is, all embodiments and/or features of any embodiments can be combined in any way and/or combination.

Some embodiments of the inventive concept may provide antenna line devices (ALDs) that are Internet Protocol (IP) addressable and can, therefore, be communicated with by any entity that has access to the Internet. The ALDs are embedded systems that can be viewed as entities in the Internet of Things (IoT). As such, the ALDs may communicate and share information with each other over the Internet. In some embodiments of the inventive concept, the ALDs may include or be coupled to a wireless modem thereby allowing communication cables and circuitry (e.g., bias tees), such as those used to support the Antenna Interface Standards Group (AISG) communication protocol interface to be eliminated. AISG controller components, which are typically incorporated into the radio frequency processing equipment portion of base stations, may also be eliminated. Because the ALDs may be accessed using a wireless communication protocol, they can be placed in more convenient locations on antenna structures saving valuable real estate for other connectors and circuitry. The ALDs may also be used to store and collect information associated with a cellular base station and antenna installation. For example, one or more ALDs may collect information on transmission patterns for one or more antennas based on various elevation angles and azimuth angles for each antenna. The ALDs may also collect geographic location information for the antennas that they are associated with. An ALD management system may request and receive the antenna transmission pattern information along with the geographic location information for the antennas to generate a signal coverage map. Such a map may be useful to a service provider in determining how to configure their antennas. In other embodiments, the ALDs may store device identification information along with identification information for the antennas that they are associated with. Frequency scanning module ALDs may be used to determine the frequency spectrum that is in use at an antenna. The ALD management system may request and receive the ALD device identification information, the antenna identification information, and the frequency spectrum usage information for the antenna(s), which can be processed to generate a summary or inventory of the equipment in use at a base station installation site along with what portion of the frequency spectrum is in use. Such an installation site summary may be generated for one or more service providers, which may be helpful in determining when to schedule maintenance of equipment, replacement of equipment, and in engineering the cellular network.

ALDs are described herein as being coupled to an antenna or other type of structure, for example. It will be understood that when an ALD is described as being coupled to another element, for example, the ALD may be a separate distinct unit from the other element or the ALD may be incorporated on or within the other element so as to be a part of the other element.

Figure 3:
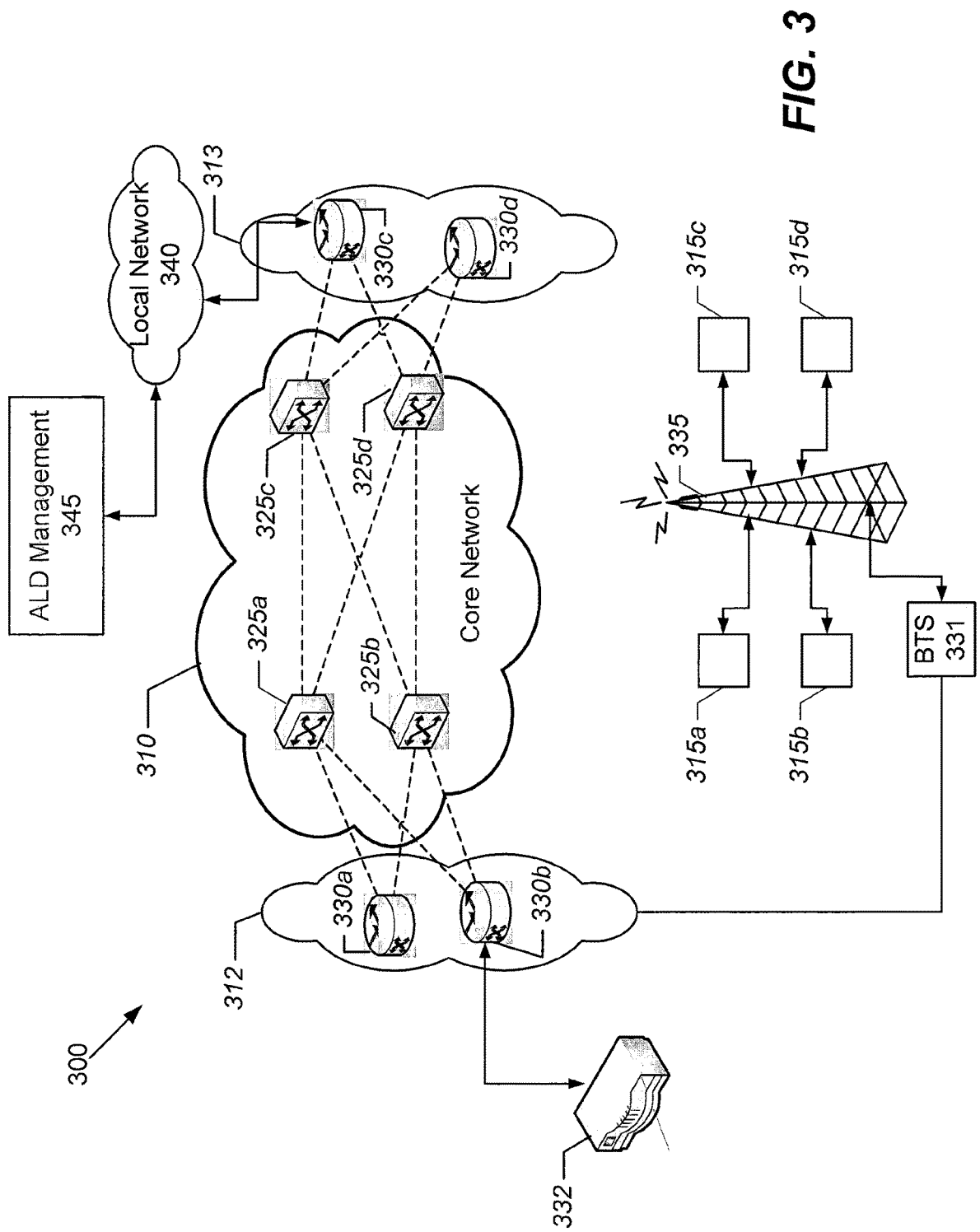
FIG. 3 is a block diagram of a communication network including Internet Protocol (IP) addressable ALDs included in a base station and cellular antenna installation according to some embodiments of the inventive concept.

FIG. 3 is a block diagram of a communication network including Internet Protocol (IP) addressable ALDs included in a base station and cellular antenna installation according to some embodiments of the inventive concept. The communication network 300 comprises a core network 310 coupled to a first access network 312 and a second access network 313. The core network 310 is the central part of the communications network 300 and provides various services to customers who are connected through the access networks 312 and 313. The core network 310 comprises switches/routers 325a, 325b, 325c, and 325d that are used to route calls and data traffic between the access networks 312 and 313. Access networks 312 and 313 comprise a part of the communications network 300 that is used to connect customers or subscribers to their immediate service provider. As shown in FIG. 3, access network 312 comprises switches/routers 330a, 330b along with the series of wires, cables, and equipment used to connect customers/subscribers associated with, for example, a wireless network, which may be represented by the installation including a base transceiver station (base station) 331 and antennas 335. The base station 331 may be communicatively coupled to the access network 312 via a wired or wireless link, such as a microwave link. Similarly, access network 313 comprises switches/routers 330c, 330d along with the series of wires, cables, and equipment used to connect customers/subscribers associated with the local network 340. The core network 310, access network 312, and access network 313 may each operate under the authority of the same entity or different entities. For example, the access network 312 and the core network 310 may operate under the authority of a first service provider while the access network 313 may operate under the authority of a second service provider. The local network 340 may operate under the authority of a different entity than the core network 310, access network 312, and access network 313. The wireless network represented by the installation including the base station 331 and antennas 335 may include numerous such installations operated under the authority of the same or different entities. Moreover, the one or more entities that operate the wireless network may be the same as one or more of the entities having operational authority for the core network 310, access networks 312/313, and/or local network 340.

The support structure for the antennas 335 may include one or more ALDs 315a, 315b, 315c, and 315d. In the example of FIG. 3, the ALD 315a may be a tower mounted amplifier, the ALD 315b may be a remote electrical tilt system, the ALD 315c may comprise one or more antenna sensor devices, and the ALD 315d may be a frequency scanning module. It will be understood that these ALD types are for purposes of illustrating embodiments of the inventive concept and additional, fewer, and/or different types of ALDs may be used in other embodiments. The ALDs 315a, 315b, 315c, and 315d may be addressable based on the Internet Protocol (IP) using, for example, IP addresses, as devices in the Internet of Things (IoT). The IoT refers to a network of physical and virtual things having embedded computer systems associated therewith that allow the things to exchange data with other entities, such as a user, operator, manufacturer, technician, analyst, etc. based on the International Telecommunication Union's Global Standards Initiative. The IoT may allow, for example, things to be sensed, monitored, and/or controlled remotely across existing network infrastructure, which may create more opportunities for direct integration between the physical world and computer-based systems, and may result in improved efficiency, accuracy, and economic benefit. Each thing may be uniquely identifiable through its associated embedded computing system and is able to interoperate within the existing Internet infrastructure. The ALDs 315a, 315b, 315c, and 315d may communicate with an IoT gateway 332 to access the core network 310 by way of the access network 312. The local network 340 may be a private network or VPN implemented in an enterprise that uses an ALD management system 345 to control the operation of the ALDs 315a, 315b, 315c, and 315d and to process data generated and/or collected by the ALDs 315a, 315b, 315c, and 315d in the IoT. The ALD management system 345 may be connected to the local network 340 using a wireless and/or wired connection.

The core network 310, access network 312, and access network 313 may be a global network, such as the Internet or other publicly accessible network. Various elements of the core network 310, access network 312, and access network 313 may be interconnected by a wide area network, a local area network, an Intranet, and/or other private network, which may not be accessible by the general public. Thus, the core network 310, access network 312, and access network 313 may represent a combination of public and private networks or a VPN. The core network 310, access network 312, and access network 313 may be a wireless network, a wireline network, or may be a combination of both wireless and wireline networks.

Although FIG. 3 illustrates IP addressable ALDs included in a base station and cellular antenna installation in accordance with some embodiments of the inventive concept, it will be understood that embodiments of the present invention are not limited to such configurations, but are intended to encompass any configuration capable of carrying out the operations described herein.

Figure 4:
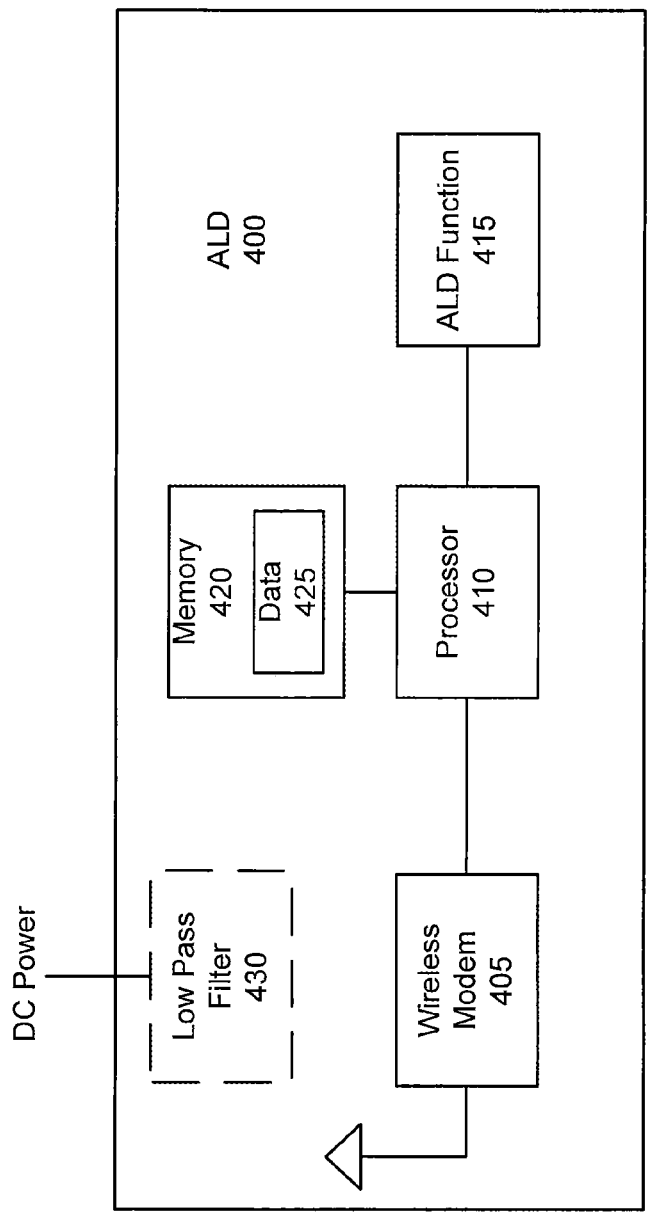
FIG. 4 is as block diagram of an IP addressable ALD of FIG. 3 according to some embodiments of the inventive concept.

FIG. 4 is a block diagram of an IP addressable ALD of FIG. 3 according to some embodiments of the inventive concept. Instead of an AISG interface, the ALD 400 includes a wireless modem 405 that can be used to communicate with the IoT gateway 332 of FIG. 3 to allow other devices, servers, and the like to communicate with the ALD 400 over the Internet using IP. For example, the ALD 400 may, in some embodiments, be accessed via its IP address. The wireless modem 405 may use a wireless communication protocol that can reach the IoT gateway 332 and meets any power and/or frequency separation requirements for the areas in which the ALD 400 and IoT gateway are installed. Example wireless communication protocols may include, but are not limited to, Z-Wave, 6LowPAN, Thread, WiFi, GSM cellular, 3G cellular, 4G/LTE cellular, 5G/LTE cellular, Sigfox, Neul, and LoRaWAN. The wireless modem 405 may be connected to or, in some embodiments, incorporate therein a processor 410, which may receive information or a command sent from the ALD management system 345 and may drive the ALD function module 415 to carry out the command or request. The processor 410 may be coupled to a memory 420 and, depending on the particular function of the ALD, various data 425 may be stored in the memory 420 for retrieval by the ALD management system 345 or other entities.

For example, when the ALD 400 is a tower mounted amplifier 315a, the ALD function 415 may be configured to adjust an amplification of a signal received from the output of an antenna responsive to a control signal, such as a message, signal, or the like, from the ALD management system 345. When the ALD 400 is a remote electrical tilt system 315b, the ALD function 415 may be configured to adjust one or more of an elevation angle of the antenna and an azimuth angle of the antenna responsive to a control signal from the ALD management system 345. When the ALD 400 is an antenna sensor device 315*c*, the ALD function 415 may be configured to collect information that is associated with the antenna, such as, but not limited to, azimuth angle, elevation angle, latitude coordinate, longitude coordinate, Global Positioning System (GPS) coordinates, wind speed, temperature, vibration amplitude, and vibration frequency. This information may be stored as data 425 in the memory 420. When the ALD 400 is a frequency scanning module 315*d*, the ALD function 415 may be configured to determine the frequency spectrum in use at the antenna. ALDs, such as remote electrical tilt systems and antenna sensor devices may be configured to collect information, such as transmission patterns of an antenna based on elevation angles, respectively, which can be stored as data 425. ALDs such as remote electrical tilt systems and antenna sensor devices may be configured to collect information, such as gain of an antenna, return loss of an antenna, and isolation of an antenna, which can be stored as data 425. Each of the various types of ALDs may be configured to store identification information indicating one or more of the ALD type, manufacturer, date of installation, installation location, and the like. The ALDs may also store similar information for the one or more antennas that they are associated with.

Figure 2:
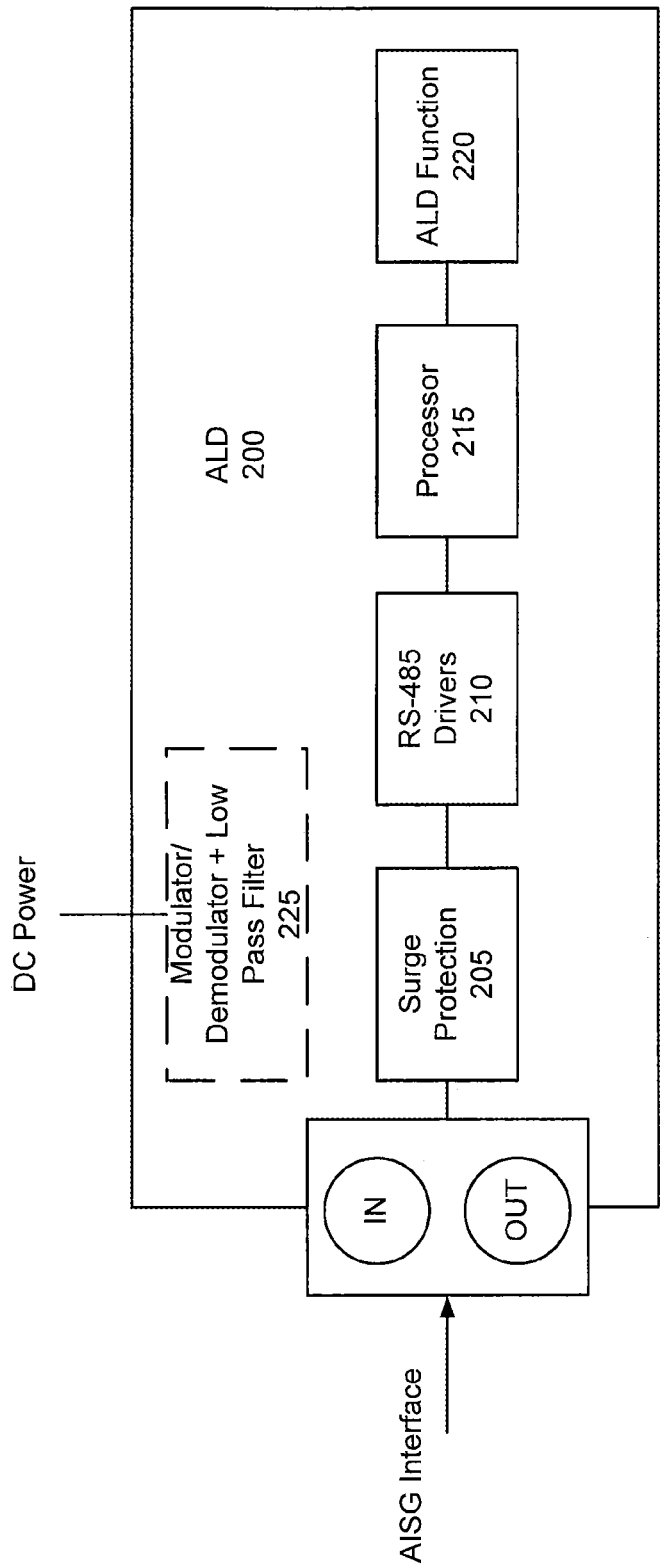
FIG. 2 is a block diagram that illustrates the ALD of FIG. 1.

As shown in FIG. 4, the ALD 400 may receive DC power through a low pass filter circuit 430 that is designed to block any RF signal on an RF feeder cable, for example. In contrast with the example ALD 200 of FIG. 2, a modulator/demodulator circuit is not needed as the communication between the ALD 400 and a controller is over an independent wireless channel and not modulated onto the RF signal from the base station. Because the ALD 400 need not be coupled to a base station via a wired AISG interface, the ALD 400 may be placed on a top end of the antenna structure so that the bottom end of the antenna structure is between the top end of the antenna structure and the base station. In addition, because the control signals, information, messages and the like communicated to and from the ALD 400 may be generated/received from any device having Internet connectivity, such as the ALD management system 345, the base station at the installation need not include an ALD control module as part of the radio frequency component.

Figure 5:
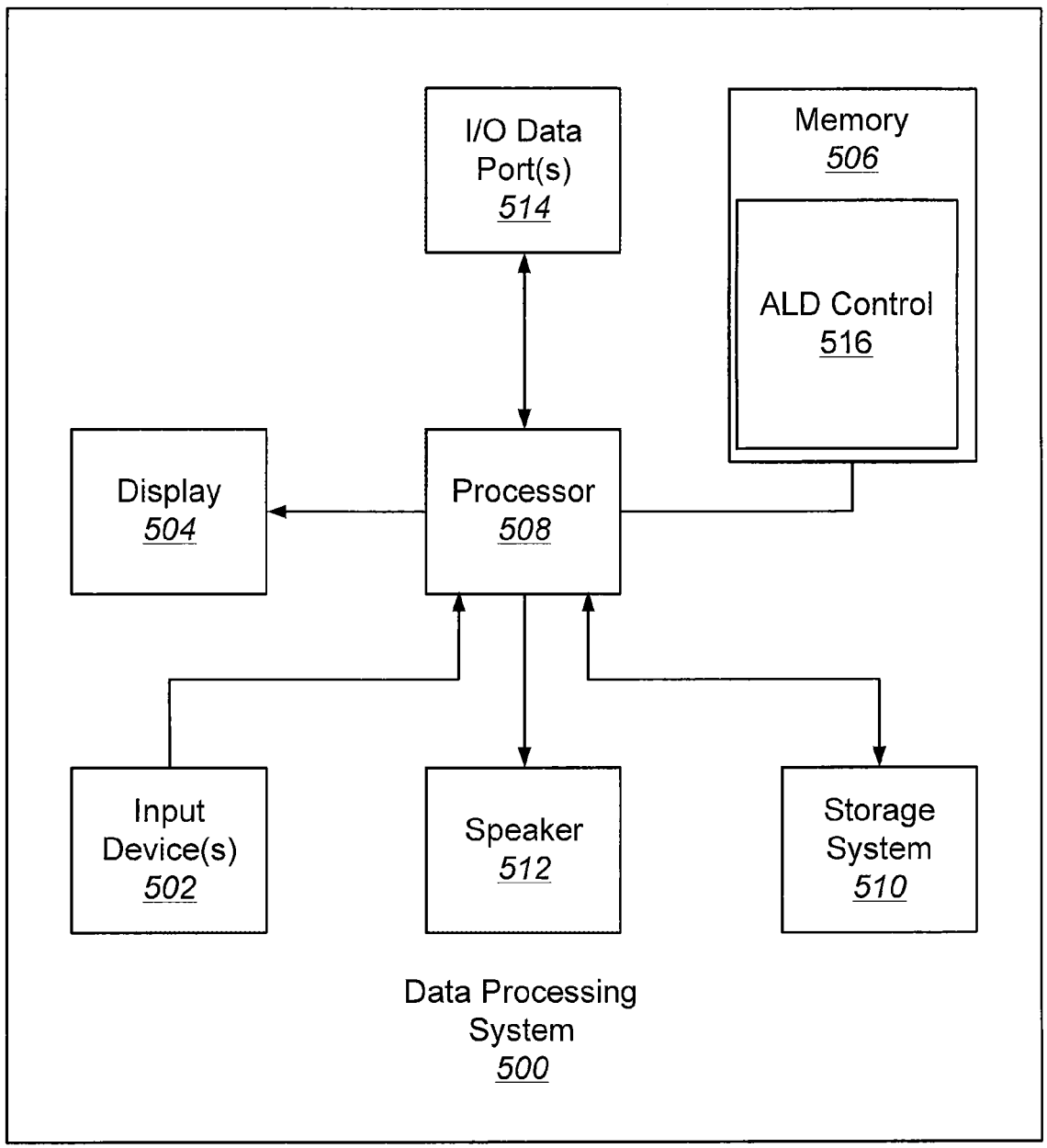
FIG. 5 is a block diagram of a data processing system that can be used to implement the ALD management system of FIG. 3 according to some embodiments of the inventive concept.

Referring now to FIG. 5, a data processing system 500 that may be used to implement the ALD management system 345 of FIG. 3, in accordance with some embodiments of the inventive concept, comprises input device(s) 502, such as a keyboard or keypad, a display 504, and a memory 506 that communicate with a processor 508. The data processing system 500 may further include a storage system 510, a speaker 512, and an input/output (I/O) data port(s) 514 that also communicate with the processor 508. The storage system 510 may include removable and/or fixed media, such as floppy disks, ZIP drives, hard disks, or the like, as well as virtual storage, such as a RAMDISK. The I/O data port(s) 514 may be used to transfer information between the data processing system 500 and another computer system or a network (e.g., the Internet). These components may be conventional components, such as those used in many conventional computing devices, and their functionality, with respect to conventional operations, is generally known to those skilled in the art. The memory 506 may be configured with an ALD control module 516 that may provide functionality that may include, but is not limited to, controlling operations of one or more IP addressable ALDs as IoT devices at one or more installations of a base station and antenna(s) and receiving information from such ALDs for further processing.

Figure 6:
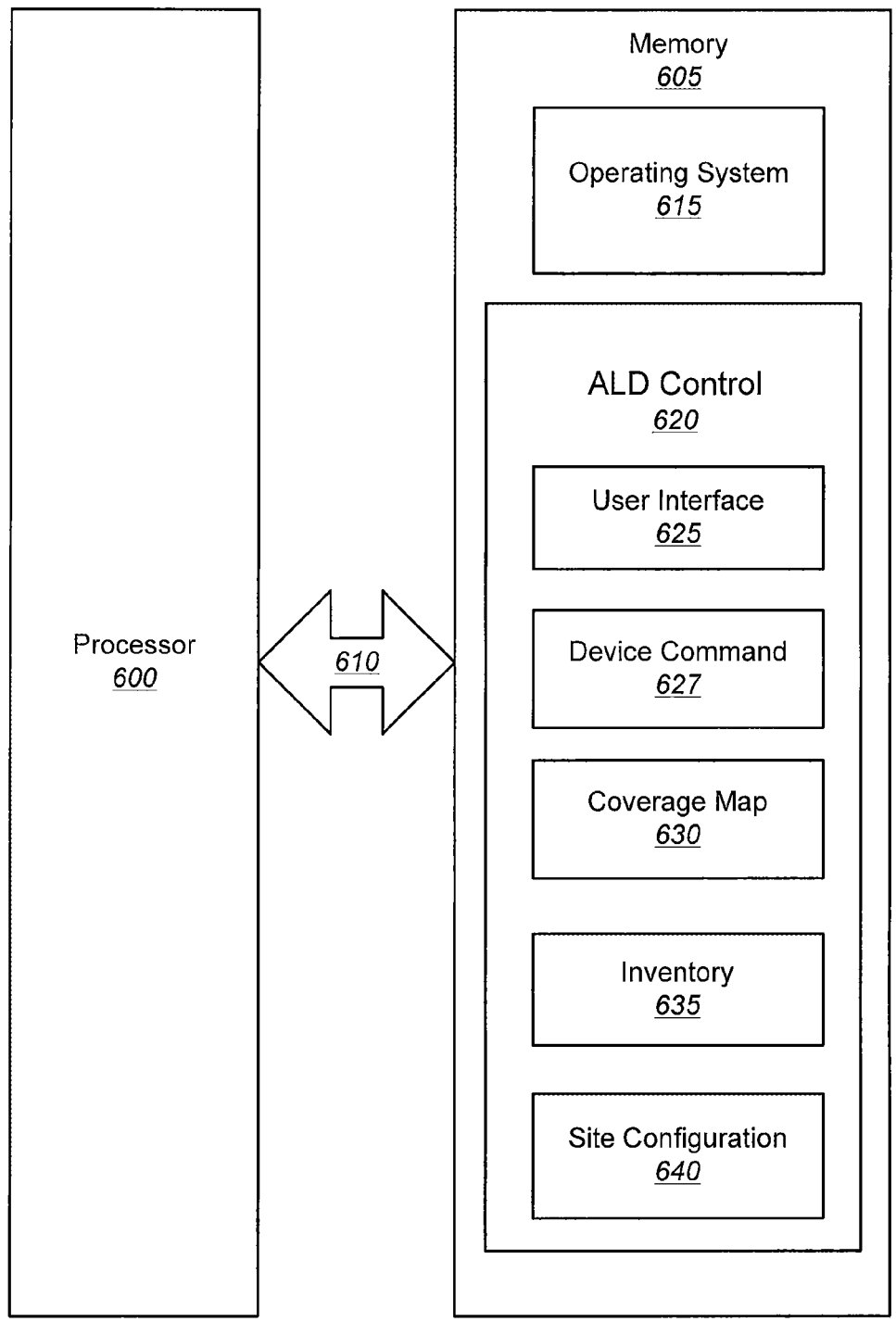
FIG. 6 is a block diagram of a hardware and software architecture that can be used to implement ALD management system of FIG. 3 according to some embodiments of the inventive concept.

FIG. 6 illustrates a processor 600 and memory 605 that may be used in embodiments of data processing systems, such as the ALD management system 345 of FIG. 3 and the data processing system 500 of FIG. 5, respectively, for controlling ALD operations and processing ALD data/information as IP addressable IoT devices in accordance with some embodiments of the inventive concept. The processor 600 communicates with the memory 605 via an address/data bus 610. The processor 600 may be, for example, a commercially available or custom microprocessor. The memory 605 is representative of the one or more memory devices containing the software and data used for controlling ALD operations and processing ALD data/information as IP addressable IoT devices in accordance with some embodiments of the inventive concept. The memory 605 may include, but is not limited to, the following types of devices: cache, ROM, PROM, EPROM, EEPROM, flash, SRAM, and DRAM.

As shown in FIG. 6, the memory 605 may contain two or more categories of software and/or data: an operating system 615 and an ALD control module 620. In particular, the operating system 615 may manage the data processing system's software and/or hardware resources and may coordinate execution of programs by the processor 600.

The ALD control module 620 may comprise a user interface module 625, a device command module 627, a coverage map module 630, an inventory module 635, and a site configuration module 640. The user interface module 625 may be configured to provide an interface to receive user input for sending control signals, messages, and the like to one or more ALDs and also for displaying information collected from ALDs.

The device command module 627 may be configured to generate commands through use of control signals, messages, and the like to one or more ALDs to control their operation. These commands may be used to drive the ALDs to perform particular operations and/or to collect data from the ALDs that the ALDs have stored in local memory.

As described above, an ALD, such as a remote electrical tilt system, may be used to store transmission patterns based on the elevation angle and/or azimuth angle of an antenna. Moreover, various types of ALD devices that are associated with an antenna can provide geographic location coordinates for the antenna, such as GPS coordinates and/or latitude and longitude coordinates. The coverage map module 630 may be configured to collect the antenna transmission patterns for one or more antennas from one or more ALDs along with the geographic location or each antenna and use this information to generate a cellular service signal coverage map, which can be provided to a user through the user interface module 625. Moreover, in some embodiments, the coverage map may show service boundaries for antennas associated with a single and/or multiple service providers.

As described above, the various types of ALDs may store identification information indicating one or more of the ALD type, manufacturer, date of installation, installation location, and the like. An ALD may also store similar information for the one or more antennas that is it associated with. The inventory module 635 may be configured to collect the inventory information from various ALDs, which may be helpful to a service provider in tracking what equipment is installed, how old the equipment is, who the manufacturer is, and other useful information that can be derived from the identification information.

The site configuration module 640 may be configured to process the inventory information collected by the inventory module 635 to generate an installation site summary that shows what equipment is installed and is in service at a site comprising a base station and one or more antennas. In addition to the inventory information, the site configuration module 640 may incorporate frequency spectrum usage collected from frequency scanning module ALDs 315*d* associated with the particular antennas at an installation site. The installation site summary may be presented to a user via the user interface 625 in a textual format or, in other embodiments, in a graphical format with icons showing the various equipment with textual annotations providing more detail about each equipment icon. The site configuration module 640 may generate installation site summaries for sites associated with a single or multiple service providers.

Although FIG. 6 illustrates hardware/software architectures that may be used in data processing systems, such as the ALD management system 345 of FIG. 3 and the data processing system 500 of FIG. 5, respectively, for controlling ALD operations and processing ALD data/information as IP addressable IoT devices in accordance with some embodiments of the inventive concept, it will be understood that the present invention is not limited to such a configuration but is intended to encompass any configuration capable of carrying out operations described herein.

Computer program code for carrying out operations of data processing systems discussed above with respect to FIGS. 3-6 may be written in a high-level programming language, such as Python, Java, C, and/or C++, for development convenience. In addition, computer program code for carrying out operations of embodiments of the present invention may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller.

Moreover, the functionality of the ALD management system 345 and ALDs 315*a*, 315*b*, 315*c*, and 315*d* of FIG. 3, the ALD 400 of FIG. 4, the data processing system 500 of FIG. 5, and the hardware/software architecture of FIG. 6, may each, as appropriate, be implemented as a single processor system, a multi-processor system, a multi-core processor system, or even in some instances a network of stand-alone computer systems, in accordance with various embodiments of the inventive subject matter. Each of these processor/computer systems may be referred to as a "processor" or "data processing system."

The data processing apparatus of FIGS. 3-6 may be used to control ALD operations and process ALD data/information as IP addressable IoT devices according to various embodiments described herein. These apparatus may be embodied as one or more enterprise, application, personal, pervasive and/or embedded computer systems and/or apparatus that are operable to receive, transmit, process and store data using any suitable combination of software, firmware and/or hardware and that may be standalone or interconnected by any public and/or private, real and/or virtual, wired and/or wireless network including all or a portion of the global communication network known as the Internet, and may include various types of tangible, non-transitory computer readable media. In particular, the memory 420 coupled to the processor 410, the memory 506 coupled to the processor 508, and the memory 605 coupled to the processor 600 include computer readable program code that, when executed by the respective processors, causes the respective processors to perform operations including one or more of the operations described herein with respect to FIGS. 7 and 8.

Figure 7:
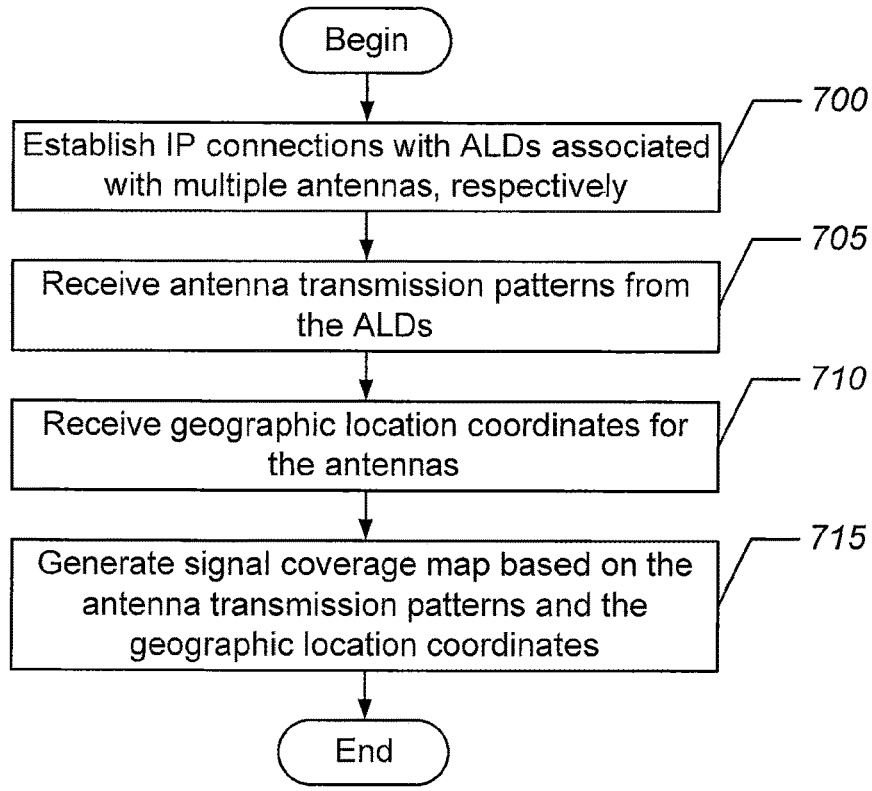
FIGS. 7 and 8 are flowcharts that illustrate operations of the ALD management system and the IP addressable ALDs of FIG. 3 according to some embodiments of the inventive concept.

FIG. 7 is a flowchart that illustrates operations of the ALD management system 345 of FIG. 3 in generating a signal coverage map in accordance with some embodiments of the inventive concept. Operations begin at block 700 where the ALD management system 345 establishes IP connections with ALDs associated with multiple antennas, respectively. As described above, an ALD, such as a remote electrical tilt system, may be used to store transmission patterns based on the elevation angle and/or azimuth angle of an antenna. Moreover, various types of ALD devices that are associated with an antenna can provide geographic location coordinates for the antenna, such as GPS coordinates and/or latitude and longitude coordinates. Thus, at block 705 the coverage map module 630 receives antenna transmission patterns from the ALDs that the ALDs had stored locally and at block 710 the coverage map module 630 receives geographic location coordinates for the various antennas. At block 715, the coverage map module 630 uses the antenna transmission patterns and the geographic location coordinates for the various antennas to generate a cellular service signal coverage map, which can be provided to a user through the user interface module 625. Such a map may be useful for a service provider in setting up service in a particular geographic region as the range of service can be visualized for various antenna configurations. In addition, in some embodiments, the signal coverage map may illustrate the range of service provided by multiple service providers based on various antenna configurations.

Figure 8:
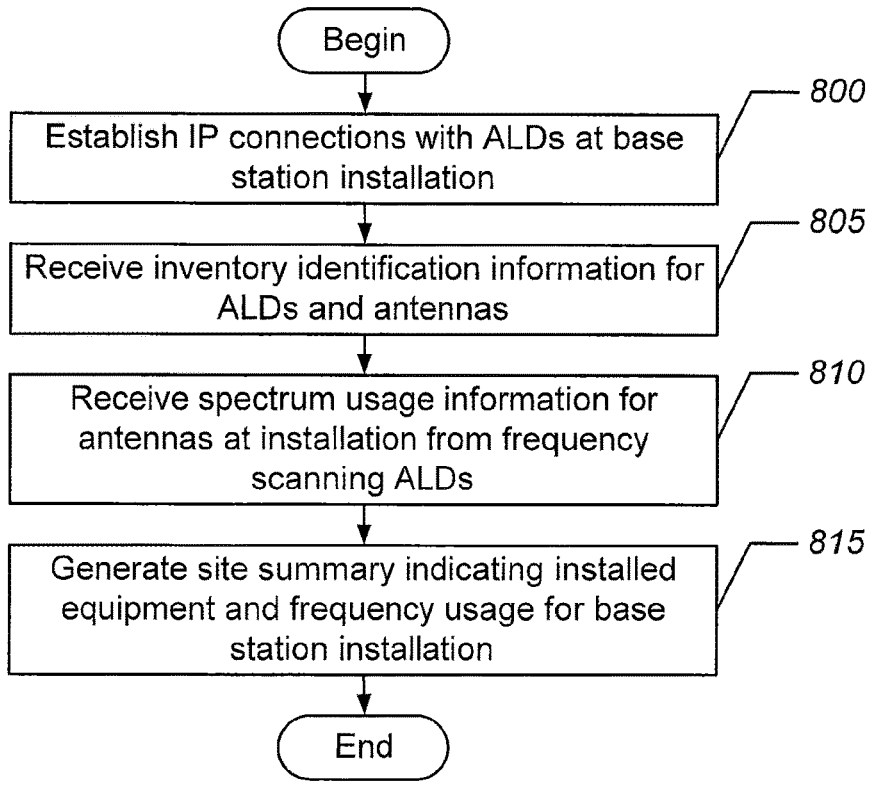

FIG. 8 is a flowchart that illustrates operations of the ALD management system 345 of FIG. 3 in generating an installation site summary in accordance with some embodiments of the inventive concept. Operations begin at block 800 where the ALD management system 345 establishes IP connections with ALDs associated with one or more antennas at a base station installation site. Identification information is received for both the ALDs and the antennas at the installation site by way of the inventory module 635 at block 805. The site configuration module 640 receives spectrum usage information for the antennas at the installation that was obtained by frequency scanning ALDs 319*d* at block 810. The site configuration module 640 generates a site summary at block 815 that shows what equipment is installed and is in service at the site. The installation site summary may be presented to a user via the user interface 625 in a textual format or, in other embodiments, in a graphical format with icons showing the various equipment with textual annotations providing more detail about each equipment icon. The site configuration module 640 may generate installation site summaries for sites associated with a single or multiple service providers. The installation site summary may provide service providers with an effective mechanism for gathering information on the status of the equipment that the service provider has installed in the field, which can be used for replacement planning and maintenance planning, for example.

Some embodiments of the inventive concept may provide ALDs that are IP addressable and, therefore, can be communicated with as entities in the IoT. The ALDs may be configured to communicate via wireless communication protocol, which may eliminate the need for the wiring and support circuitry used to support conventional AISG communication. The ALDs may also be used to collect and store various types of information associated with a cellular base station installation including, but not limited to, antenna transmission patterns, antenna sensor data, frequency use information, component identification information, and the like, which may be accessed over the Internet and processed to allow service providers to better manage their networks.

Further Definitions and Embodiments

In the above-description of various embodiments of the present disclosure, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

Terms such as "top," "bottom," "upper," "lower," "above," "below," and the like are used herein to describe the relative positions of elements or features. For example, when an upper part of a drawing is referred to as a "top" and a lower part of a drawing is referred to as a "bottom" for the sake of convenience, in practice, the "top" may also be called a "bottom" and the "bottom" may also be a "top" without departing from the teachings of the inventive concept.

Furthermore, throughout this disclosure, directional terms such as "upper," "intermediate," "lower," and the like may be used herein to describe the relationship of one element or feature with another, and the inventive concept should not be limited by these terms. Accordingly, these terms such as "upper," "intermediate," "lower," and the like may be replaced by other terms such as "first," "second," "third," and the like to describe the elements and features.

It will be understood that, although the terms "first," "second," etc. may be used herein to describe various elements, these elements should not be limited by these terms. These terms are only used to distinguish one element from another. Thus, a first element could be termed a second element without departing from the teachings of the inventive concept.

The terminology used herein to describe embodiments of the invention is not intended to limit the scope of the inventive concept.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method, comprising:
   establishing Internet Protocol (IP) connections with an antenna line device, the antenna line device being coupled to an antenna at a base station installation;
   receiving frequency spectrum usage information for the antenna from the antenna line device;
   receiving antenna identification information from the antenna line device;
   receiving antenna line device identification information from the antenna line device; and
   generating an installation site summary that comprises the spectrum usage information, the antenna line device identification information, and the antenna identification information.

2. The method of claim 1, wherein the installation site summary comprises a graphic illustration of the antenna and antenna line device.

3. The method of claim 1, wherein the base station installation comprises a plurality of antennas and a plurality of antenna line devices coupled to the plurality of antennas, respectively;
   wherein receiving the frequency spectrum usage information comprises receiving frequency spectrum usage information for the plurality of antennas from the plurality of antenna line devices, respectively;
   wherein receiving the antenna identification information comprises receiving antenna identification information for the plurality of antennas from the plurality of antenna line devices, respectively;
   wherein receiving the antenna line device identification information comprises receiving antenna line device identification information for the plurality of antenna line devices from the plurality of antenna line devices, respectively; and
   wherein generating the installation site summary comprises generating the installation site summary that comprises the spectrum usage information for the plurality of antennas, the antenna identification information for the plurality of antennas, and the antenna line device identification information for the plurality of antenna line devices.

4. The method of claim 3, wherein the installation site summary comprises a graphic illustration of the plurality of antennas and the plurality of antenna line devices.

5. The method of claim 3, wherein the plurality of antenna line devices comprise an amplifier, a remote electrical tilt system, a sensor, and a frequency scanning module.

6. The method of claim 1, wherein the antenna line device is an amplifier that is coupled to an output of the antenna; and
   wherein the method further comprises adjusting an amplification of a signal received from the output of the antenna responsive to the control signal.

7. The method of claim 1, wherein the antenna line device is a remote electrical tilt system that is coupled to the antenna; and
   wherein the method further comprises adjusting at least one of an elevation angle of the antenna and an azimuth angle of the antenna responsive to the control signal.

8. The method of claim 1, wherein the antenna line device is a sensor that is associated with the antenna; and
   wherein the method further comprises collecting information that is associated with the antenna, the information comprising at least one of azimuth angle, elevation angle, latitude coordinate, longitude coordinate, Global Positioning System (GPS) coordinates, wind speed, temperature, vibration amplitude, and vibration frequency.

9. The method of claim 1, wherein the antenna line device is a frequency scanning module that is coupled to the antenna; and
   wherein the method further comprises determining the frequency spectrum in use at the antenna.

10. The method of claim 1, wherein the antenna line device is coupled to a wireless modem; and
    wherein establishing, at the antenna line device, the IP connection with the controller comprises using the wireless modem to establish the IP connection with the controller using a wireless communication protocol, the wireless communication protocol comprising one of Z-Wave, 6LowPAN, Thread, WiFi, GSM cellular, 3G cellular, 4G/LTE cellular, 5G/LTE cellular, Sigfox, Neul, and LoRaWAN.

11. The method of claim 1, wherein the antenna line device further comprises a memory; and
    wherein the method further comprises storing a plurality of antenna transmission patterns for the antenna, the plurality of antenna transmission patterns corresponding to a plurality of elevation angles for the antenna, respectively in the memory.

12. The method of claim 1, wherein the antenna line device further comprises a memory; and wherein the method further comprises storing a gain of the antenna, a return loss of the antenna, and an isolation of the antenna in the memory.

13. The method of claim 1, wherein the antenna is coupled to a base station; and wherein the controller is disposed apart from the base station.

14. The method of claim 13, wherein receiving, at the antenna line device, the control signal from the controller comprises receiving, at the antenna line device, the control signal from the controller over the Internet.

* * * * *